United States Patent [19]
Kawamoto et al.

[11] Patent Number: 5,973,736
[45] Date of Patent: *Oct. 26, 1999

[54] COLOR LINEAR SENSOR

[75] Inventors: Seiichi Kawamoto; Tadakuni Narabu, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,677

[22] Filed: May 1, 1996

Related U.S. Application Data

[63] Continuation of application No. 07/911,552, Jul. 9, 1992, abandoned.

[30] Foreign Application Priority Data

Jul. 10, 1991 [JP] Japan ..................................... 3-197242
Jul. 10, 1991 [JP] Japan ..................................... 3-197243

[51] Int. Cl.$^6$ .............................. H04N 3/14; H04N 5/335
[52] U.S. Cl. ......................... 348/324; 348/241; 348/272; 348/248; 358/513; 250/208.1
[58] Field of Search ................................... 348/281–283, 348/272, 280, 266, 260, 243, 241, 242, 244, 245, 248, 249, 250, 294, 302–308, 311, 319, 320, 321, 324; 358/513, 512; 250/208.1; 257/238, 239; H04N 3/14, 5/335

[56] References Cited

U.S. PATENT DOCUMENTS

| | | | |
|---|---|---|---|
| 4,447,735 | 5/1984 | Horii ................................... | 358/213.23 |
| 4,581,651 | 4/1986 | Miyata et al. ...................... | 358/213.26 |
| 4,630,121 | 12/1986 | Suzuki et al. ............................ | 348/245 |
| 4,663,658 | 5/1987 | Elabd et al. ............................. | 348/316 |
| 4,707,615 | 11/1987 | Hosaka .................................... | 358/212 |

(List continued on next page.)

FOREIGN PATENT DOCUMENTS

| | | |
|---|---|---|
| 0 313 278 A2 | 4/1989 | European Pat. Off. . |
| 2 553 661 | 4/1985 | France . |

OTHER PUBLICATIONS

IEEE Transactions on Consumer Electronics, vol. 37, (1191) Aug., No. 3, New York, "A CCD Color Linear Image Sensor Employing New Transfer Method", Kawamoto et al., pp. 481–486.

IEEE Transactions on Consumer Electronics, "A CCD Color Linear Image Sensor Employing New Transfer Method", Jun. 5, 1991, Illinois, pp. 150–151.

(List continued on next page.)

*Primary Examiner*—Michael H. Lee
*Attorney, Agent, or Firm*—Hill & Simpson

[57] ABSTRACT

The present invention is directed to a color linear sensor of a simple structure which can accurately measure a degree of a color mixture in a sensor section. In a color linear sensor having a dot-sequential sensor array (1), only one pixel of a predetermined color (R) in a reference pixel region (3) is allowed to receive an incident light. Then, a degree of color mixture is estimated by calculating a level difference between a signal output of this pixel and a signal output of a pixel of the same color as that of the former pixel in an effective pixel region (2). Also, the present invention is to provide a color linear sensor which can prevent sensors from being displaced from each other in position, simplify a configuration of an external circuit and which can prevent a color mixture from being caused by signal charges deteriorated after they are transferred by a transfer register. In a color linear sensor having a dot-sequential sensor array (1), read-out gates (22, 24) are formed as two-stage configuration for sequentially reading out signal charges from respective sensors (1R), (1G), (1B) of the dot-sequential sensor array (1) to a CCD register (23) at the unit of pixels, thereby to sequentially output signal charges of one line at every color in a line-sequential fashion.

12 Claims, 5 Drawing Sheets

U.S. PATENT DOCUMENTS

| | | | |
|---|---|---|---|
| 4,750,042 | 6/1988 | Murayama et al. | 358/213.23 |
| 4,761,683 | 8/1988 | Matteson et al. | 358/213.26 |
| 4,811,105 | 3/1989 | Kinoshita et al. | 358/213.29 |
| 4,878,121 | 10/1989 | Hynecek | 348/319 |
| 4,972,255 | 11/1990 | Suzuki et al. | 348/266 |
| 4,974,072 | 11/1990 | Hasegawa | 358/77 |
| 5,105,276 | 4/1992 | Schrock | 348/241 |

OTHER PUBLICATIONS

*Patent Abstract of Japan*, vol. 9, No. 147, Jun. 21, 1985 "Solid State Image Pickup Element".

*IEEE 1991 International Conference on Consumer Electronics*, pp. 150–151, Kawamoto et al. "A CCD Color Linear Image Sensor Employing New Transfer Method".

*IEEE Transactions on Consumer Electronics*, vol. 37, No. 3, Aug. 1991, pp. 481–486, Kawamoto et al., "A CCD Color Linear Image Sensor Employing New Transfer Method".

COLOR LINEAR SENSOR

This is a continuation of application Ser. No. 07/911,552 filed Jul. 9, 1992, now abandoned.

BACKGROUND OF THE INVENTION

1. Field of the Invention

The present invention generally relates to color linear sensors and, more particularly, to a color linear sensor having a dot-sequential sensor array in which photo sensors of three colors such as R (red), G (green), B (blue) or the like are sequentially arranged at the unit of pixels in a one-dimensional fashion.

2. Description of the Prior Art

Linear image sensors (hereinafter simply referred to as "linear sensor") have advantages such that they are small in size and low in electric power consumption. Hence, the linear image sensors are utilized in a wide variety of fields such as copy, facsimile image transmission, optical character recognition (OCR), pattern recognition, measurement and so on. As color copies are popularizing recently, color linear sensors are often utilized.

Figure 1:
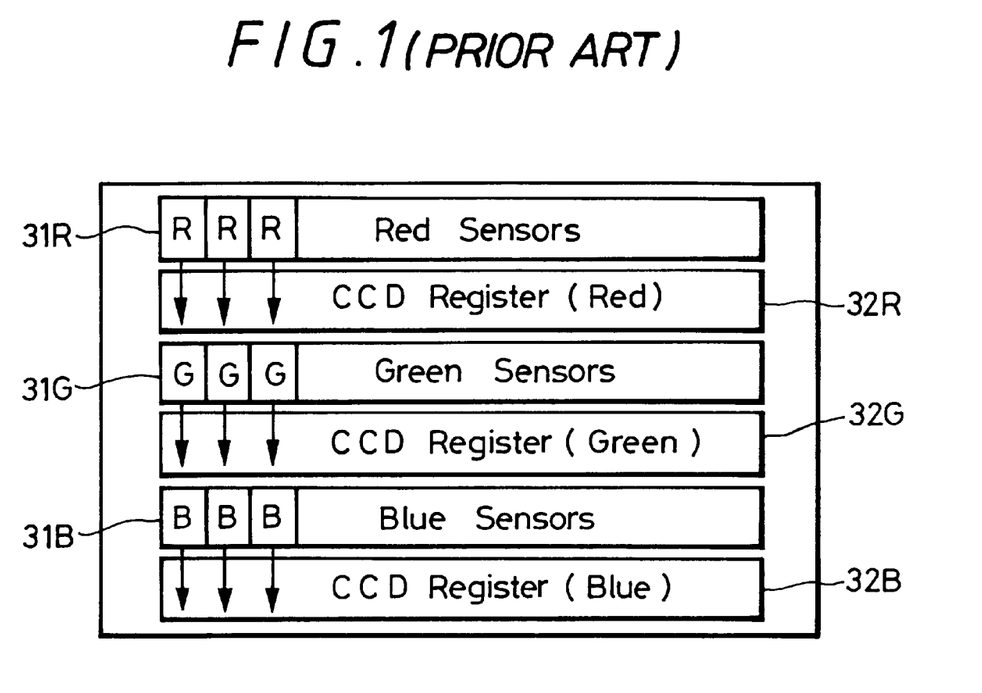
FIG. 1 is a diagram of a structure of an example of a color linear sensor of a line-sequential output type that includes three dot-sequential sensor arrays according to the prior art.

FIG. 1 of the accompanying drawings shows a structure of a conventional color linear sensor of R, G, B line-sequential output type having three sensor arrays.

As shown in FIG. 1, this type of color linear sensor comprises three sensor arrays 31R, 31G, 31B for three colors and transfer registers 32R, 32G, 32B disposed relative to the above sensor arrays 31R, 31G, 31B to thereby output signal charges of one line for every color in a line-sequential fashion.

Figure 2:
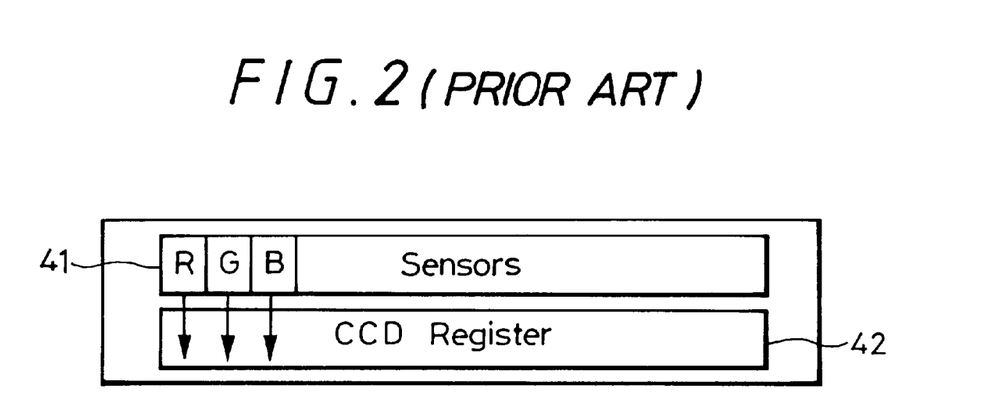
FIG. 2 is a diagram of a structure of another example of a color linear sensor of a dot-sequential output type that includes a single dot-sequential sensor array according to the prior art.

FIG. 2 of the accompanying drawings shows a structure of another example of a conventional color linear sensor.

As shown in FIG. 2, this conventional color linear sensor is what might be called an R, G, B dot-sequential output type and includes a single sensor array 41 composed of R, G, B sensors arranged sequentially at the unit of pixels in a one-dimensional fashion and a single transfer register 42 opposed to the sensor array 41, thereby to output signal charges of respective pixels of one line simultaneously in a dot-sequential manner.

The above color linear sensor of line-sequential output type includes the three sensor arrays 31R, 31G, 31B so that, when these sensor arrays 31R, 31G, 31B scan an object upon copying or the like, they are displaced from each other in position, which needs many memories for correcting such displacement. Furthermore, the above color linear sensor of line-sequential type needs three output pins (terminals) corresponding to three colors, R, G, B, which needs extra circuits such as an analog-to-digital (A/D) converter or the like to effect the signal processing in the outside. There is then the disadvantage such that an external circuit becomes complicated in configuration.

On the other hand, the color linear sensor of dot-sequential output type having the single sensor array needs only a single output pin, which needs a single signal processing system. However, since the prior-art color linear sensor is of the dot-sequential output type, sensors of different colors are repeatedly arranged, i.e., a green signal component is output after a red signal component is output, a blue signal component is output after the green signal component is output and the next red signal component is output after the blue signal component is output, etc. As a result, the signal component of the adjacent sensor section is mixed into the signal component of the adjacent sensor section. This phenomenon will hereinafter be referred to as "color mixture". That is, this mixed signal component appears as a color mixture on a picture after signal charges are transferred and deteriorated by the transfer register 42. Thus, it is desirable that the color mixture in the sensor section is eliminated as much as possible. Therefore, in the manufacturing process of color linear sensors, a degree with which the color mixture occurred in the sensor section must be measured and respective sections of the color linear sensor must be adjusted in accordance with the measured degree of the color mixture.

OBJECTS AND SUMMARY OF THE INVENTION

Accordingly, it is an object of the present invention to provide an improved color linear sensor in which the aforesaid shortcomings and disadvantages encountered with the prior art can be eliminated.

More specifically, it is an object of the present invention to provide a color linear sensor of simple structure which can accurately measure a degree of color mixture.

Another object of the present invention is to provide a color linear sensor in which sensor sections can be prevented from being displaced in position.

Still another object of the present invention is to provide a color linear sensor in which an external circuit can be simplified in configuration.

A further object of the present invention is to provide a color linear sensor in which a color mixture due to a deterioration of signal charges after the signal charges are transferred by a transfer register can be avoided.

According to a first aspect of the present invention, there is provided a solid state color imaging device which comprises a sensor array including a plurality of photo sensing units consisting of a first color sensor, a second color sensor and a third color sensor, the first color, second color and third color sensors being adopted for converting the light received by way of different color transmitting filters into signal charges, a horizontal shift register for transferring the signal charges generated in the sensors in response to a plurality of transfer pulse signals, a plurality of first gate sections for transferring the signal charges generated in the sensors to the horizontal shift register in response to a plurality of read-out gate pulse signals, the plurality of first gate sections disposed between the sensor array and the horizontal shift register, and consisting of a plurality of segments corresponding to each photo sensing unit, and a plurality of second gate sections disposed between the first gate section and the horizontal shift register and having a plurality of gate portions each corresponding to one of the plurality of segments of the first gate section.

According to a second aspect of the present invention, there is provided a method of transferring signal charges in a solid state color imaging device that comprises a sensor array constituted by a linear array of first color sensors, second color sensors and third color sensors, the first color, second color and third color sensors being adopted for converting the light received by way of different color transmitting filters into signal charges, a horizontal shift register for transferring the signal charges generated in the sensors in response to a plurality of transfer pulse signals, a plurality of gate sections for transferring the signal charges generated in the sensors to the horizontal shift register in response to a plurality of readout gate pulse signals, the gate sections disposed between the sensor array and the horizontal shift register, and a charge detecting section disposed next to the horizontal shift register. This method comprises the steps of transferring first signal charges generated in the first color sensors to the horizontal shift register by way of the plurality of gate sections and subsequently transferring the first signal charges to the charge detecting section through the horizontal shift register in a first time period, transferring second signal charges generated in the second color sensors to the horizontal shift register by way of the plurality of gate sections and subsequently transferring the second signal charges to the charge detecting section through the horizontal shift register in a second time period following the first time period, and transferring third signal charges generated in the third color sensors to the horizontal shift register by way of the plurality of gate sections and subsequently transferring the third signal charges to the charge detecting section through the horizontal shift register in a third time period following the second time period.

In accordance with a third aspect of the present invention, a solid state color imaging device comprises a sensor array constituted by a linear array of first color sensors, second color sensors and third color sensors, the first, second and third color sensors being adopted for converting the light received by way of different color transmitting filters into signal charges, an optical black area including a plurality of light shielded sensors, a standard sensor formed in the optical black area, the standard sensor being adopted for converting the light received by way of a color transmitting filter which has a specific color selected among the different colors into standard signal charges with no other color mixed, and horizontal shift register for transferring the signal charges generated in the first, second and third color sensors and the standard signal charges generated in the standard sensor.

The above and other objects, features, and advantages of the present invention will become apparent from the following detailed description of illustrative embodiments thereof to be read in conjunction with the accompanying drawings.

DETAILED DESCRIPTION OF THE PREFERRED EMBODIMENTS

The present invention will now be described in detail with reference to the drawings.

Figure 3:
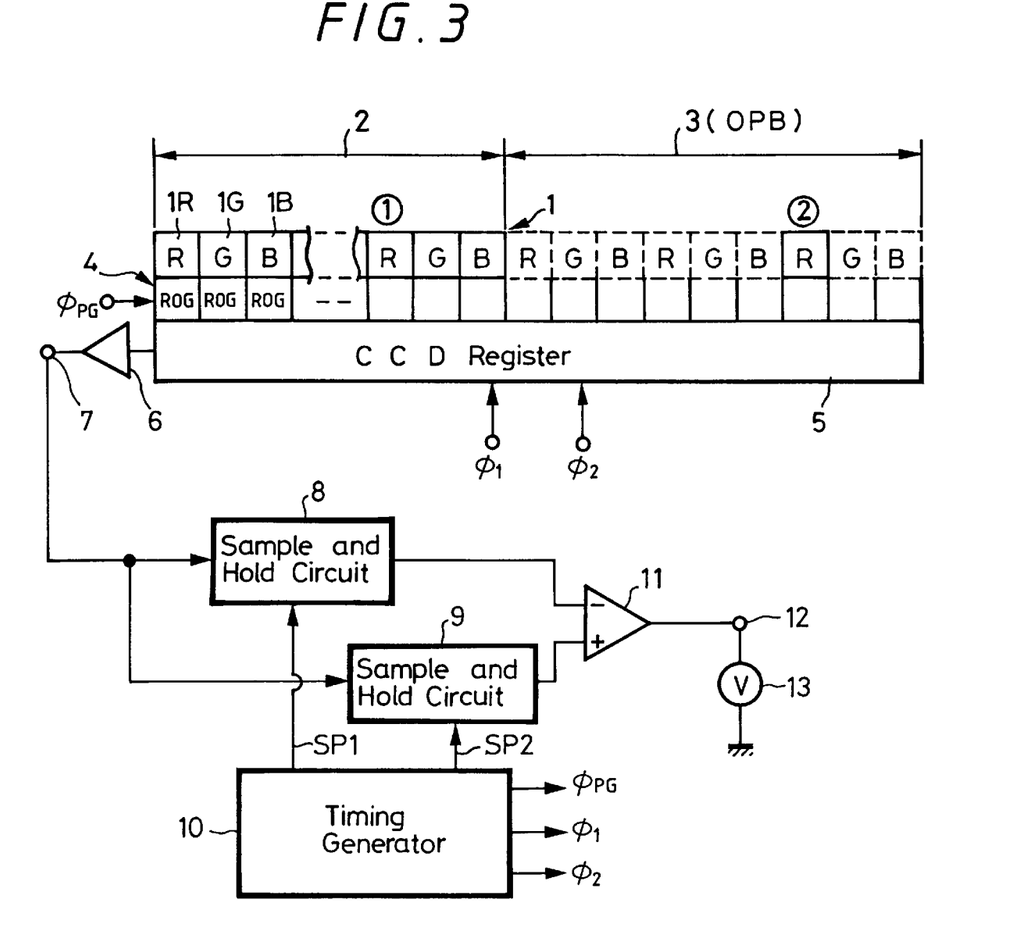
FIG. 3 is a diagram of a structure of a color linear sensor according to a first embodiment of the present invention.

FIG. 3 of the accompanying drawings shows a structure of a color linear sensor according to a first embodiment of the present invention.

Referring to FIG. 3, a dot-sequential sensor array 1 comprises photo sensors 1R, 1G, 1B of three colors R, G, B each having a corresponding color filter (not shown) sequentially and repeatedly arranged at the unit of pixels in a one-dimensional fashion. The dot-sequential sensor array 1 is divided to provide an effective pixel region 2 which photoelectrically converts an incident light from the outside by the respective photo sensors 1R, 1G, 1B to obtain an image information and a reference pixel region 3 known as an optical black (OPB) region for detecting a reference level, e.g., black level (O level) of an image information. Then, the reference pixel region 3 can receive a light of only one pixel e.g., red pixel (R).

Signal charges stored in the respective photo sensors of the dot-sequential sensor array 1 are simultaneously read out to a CCD (charge coupled device) register 5 as information of one line by a read-out gate (ROG) 4 composed of gate group disposed at every sensor. The CCD register 5 operates to sequentially transfer signal charges, read-out from the dot-sequential sensor array 1 by the read-out gate 4, in response to two-phase pulses $\phi 1$, $\phi 2$ to an output terminal (left-hand side of FIG. 3). At the output terminal of the CCD register 5, there is connected a charge detecting section 6 which detects and converts a transferred signal charge into an electrical signal. This electrical signal is developed at the output terminal 7 as an image signal.

The image signal developed at the output terminal 7 is supplied to sample and hold circuits 8 and 9. The sample and hold circuits 8 and 9 operate to hold the signal level of the image signal in synchronism with sampling pulses SP1, SP2 that are generated from a timing generator 10 at different timings. Hold outputs from the sample and hold circuits 8, 9 are supplied to a differential amplifier 11, in which they are processed to provide a level difference therebetween. A voltmeter 13, for example, is connected between an output terminal 12 of the differential amplifier 11 and the ground.

The timing generator 10 operates to generate the sampling pulse SP1 at timing at which a signal charge of a certain R sensor ① in the effective pixel region 2 of the sensor array 1 is output and the sampling pulse SP2 at timing at which a signal charge of a certain operative R sensor ② in the reference pixel region 3 is output. Further, the timing generator 10 generates a variety of timing signals, such as a gate pulse $\phi_{GP}$ used to open and/or close the read-out gate 4, the two-phase transfer clocks $\phi_1$, $\phi_2$ or the like.

Operation of the color linear sensor according to the first embodiment of the present invention will be described below.

Figure 4:
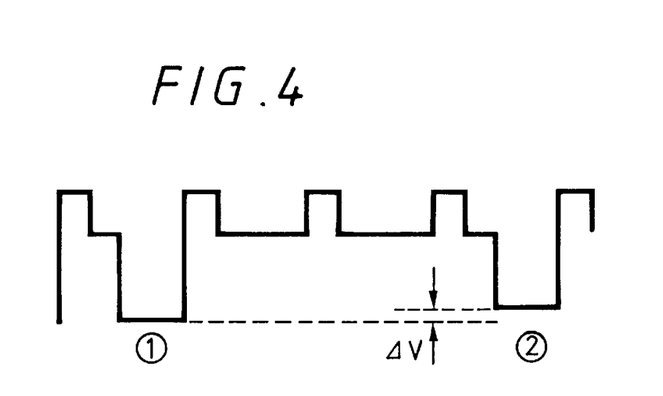
FIG. 4 is a diagram of a waveform of an image signal of a red (R) component.

Signal charges of the respective sensors in the sensor array 1 are read-out to the CCD register 5 by the read-out gate 4 and sequentially transferred to the output terminal side by the CCD register 5, thereby the image signal of one line being developed at the output terminal 7. Study of only the R (red) signal component of R, G, B signal components reveals that an output waveform of the R signal component is presented as shown in FIG. 4. In the waveform diagram of FIG. 4, waveforms ② and ② correspond to the red (R) sensor ② in the effective pixel region 2 and the operative red sensor ② in the reference pixel region 3.

At timings ①and ②, the timing generator 10 generates the sampling pulses SP1 and SP2, whereby the voltage levels of the waveforms ①and ②are sampled and held by the sample and hold circuits 8 and 9. Then, the differential amplifier 11 calculates a level difference ΔV between the waveforms ①and ②and this level difference ΔV is indicated by the voltmeter 13.

The operative R (red) sensor ②in the reference pixel region 3 can be protected from being affected by the color mixture because the adjacent B (blue) and G (green) sensors are light-shielded sensors. Consequently, the difference ΔV of the voltage level of the waveform ①relative to the voltage level of the waveform ②a shows a degree of the color mixture of the R sensor in the effective pixel region ② and a degree of the color mixture of the respective sensors.

Color mixture may occur due to the following two cases (1) and (2): In any cases, the color mixture does not occur in the operative R sensor in the reference pixel region 3, while the color mixture occurs only in the R sensor ①in the effective pixel region 2.

Figure 5:
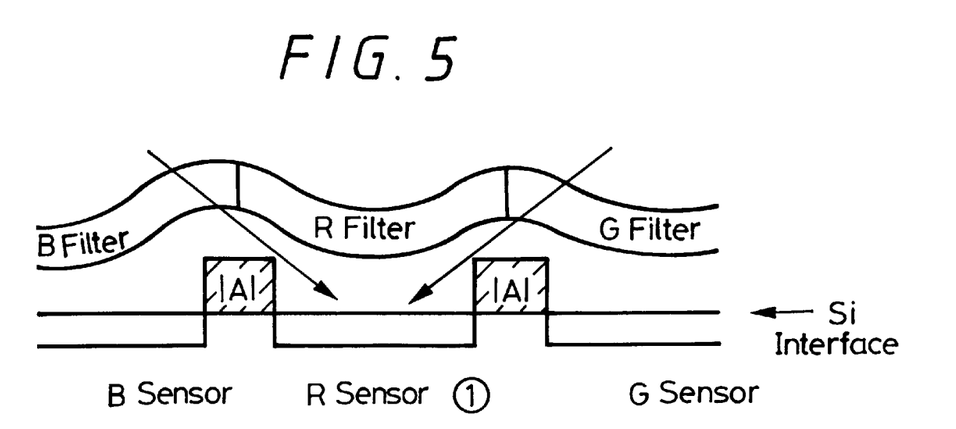
FIG. 5 is a fragmentary cross-sectional view used to explain a cause of the occurrence of a color mixture.

The case (1): As shown in FIG. 5, light beams traveling through the color filters (B filter and G filter) on the adjacent B and G sensors are introduced into the R sensor which should be protected from the incident light, thereby causing the color mixture.

Figure 6:
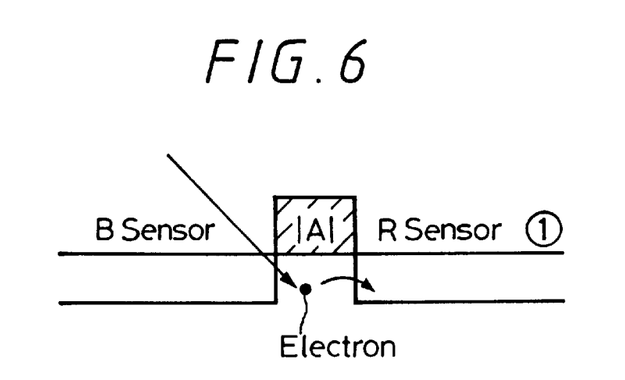
FIG. 6 is a fragmentary cross-sectional view used to explain another cause of the occurrence of a color mixture.

The case (2): As shown in FIG. 6, an electron photoelectrically-converted near an Si interface of sensors by an incident light beam from the adjacent B and G sensors enters the R sensor ①, thereby causing the color mixture.

The degree of color mixture occurred due to the above causes can be measured as the level difference ΔV by the color linear sensor of this embodiment. Accordingly, if the position of color filters is adjusted and the pattern of the sensor section is optimized such that the level difference ΔV, i.e., the color mixture is minimized in the manufacturing process of the color linear sensor, then it becomes possible to provide a color linear sensor which has little color mixture.

While only the R sensor in the reference pixel region 3 is designed so as to receive an incident light as described above, the operative sensor is not limited to the R sensor and might be sensors of other colors, i.e., G and B sensors. In short, it is sufficient that a level difference between the signal output of the sensor operative in the reference pixel region 3 and the signal output of the sensor of the same color as that of the R sensor in the effective pixel region 2 can be measured.

While the level difference ΔV of the voltage level of the waveform ①relative to the voltage level of the waveform ②is detected by the circuit configuration composed of the sample and hold circuits 8, 9 and the differential amplifier 11, the circuit configuration is not limited thereto and any circuit configuration becomes possible insofar as it can detect the level difference ΔV.

As described above, according to the present invention, since the color linear sensor having the dot-sequential sensor array is arranged such that only one pixel of a predetermined color in the reference pixel region is allowed to receive an incident light and that a level difference between the signal output of this pixel and the signal output of the pixel of the same color as that of this pixel in the effective pixel region is calculated, the color mixture can be prevented from occurring in the operative pixel in the reference pixel region. Therefore, a degree with which the color mixture occurs in the sensor section in the effective pixel region can be accurately measured by the simple arrangement.

Figure 7:
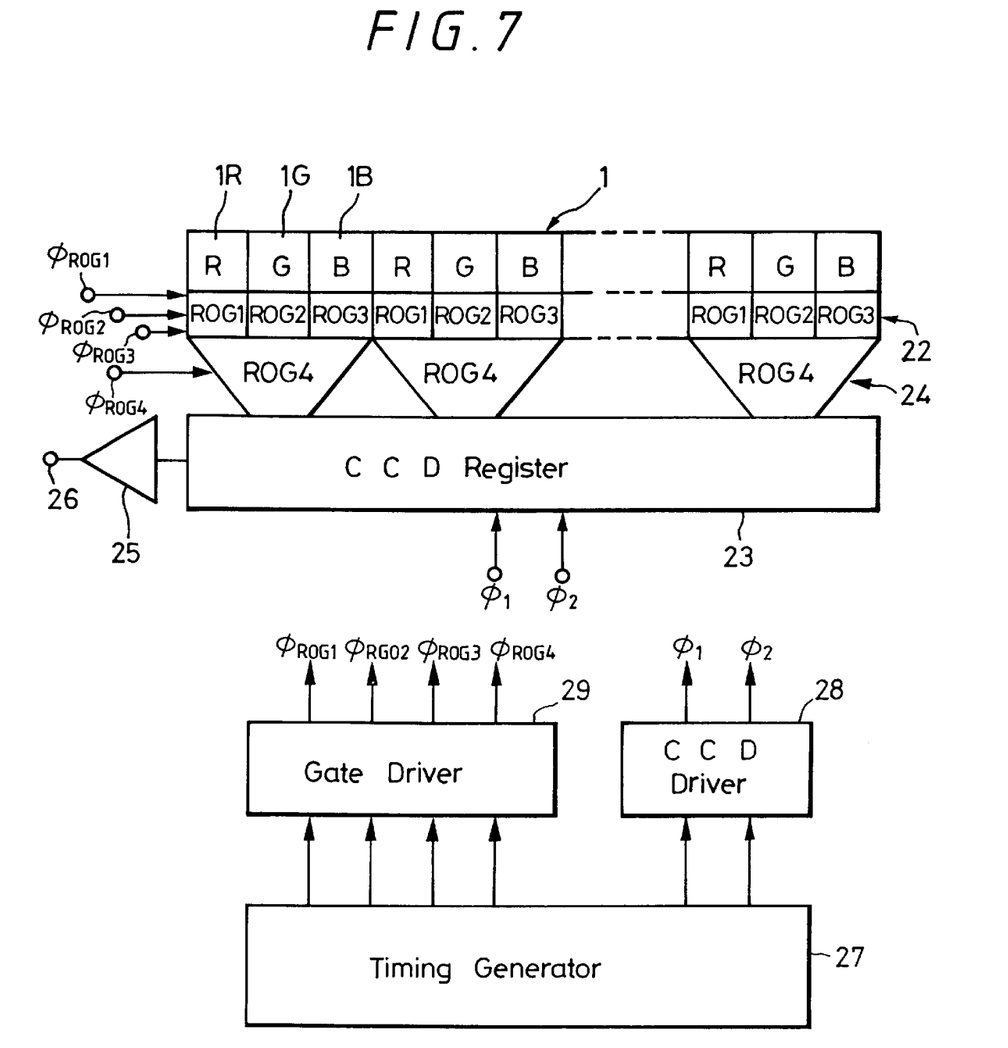
FIG. 7 is a diagram of a structure of the color linear sensor according to a second embodiment of the present invention.

FIG. 7 of the accompanying drawings shows a structure of a color linear sensor according to a second embodiment of the present invention.

As shown in FIG. 7, the three photo sensors 1R, 1G, 1B having color filters corresponding to R (red), G (green) and B (blue), for example, are sequentially arranged at the unit of pixels in a one-dimensional manner to construct the sensor array 1. Signal charges stored in the respective photo sensors forming the sensor array 1 are read out at the unit of pixels by a first read-out gate 22 which is composed of gate groups (ROG1, ROG2 and ROG3) disposed at every sensor.

A single CCD register 23 is disposed as a transfer register for transferring signal charges read out from the sensor array 1. The CCD register 23 has a bit number of ⅓ of pixel number of the sensor array 1. Between the first read-out gate 22 and the CCD register 23, there is disposed a second read-out gate (ROG4) 24 for every adjacent photo sensors 1R, 1G, 1B of three colors in the sensor array 1. The second read-out gate 24 operates to supply signal charges of three pixel amounts sequentially readout by the first read-out gate 22 to one bit of the CCD register 23.

Then, the CCD register 23 sequentially transfers signal charges, sequentially read-out from the sensor array 1 at the unit of pixels by the first and second read-out gates 22, 24, to an output terminal (left-hand side of FIG. 7) in response to the two-phase pulses ($\phi_1$, $\phi_2$). A charge detecting section 25 for detecting and converting a signal charge transferred into an electrical signal is connected to the output terminal of the CCD register 23. Then, this electrical signal is developed at a single output terminal (pin) 26 and then fed to an external circuit (not shown).

A timing generator 27 is adapted to generate at proper timings the transfer clocks $\phi_1$, $\phi_2$ that are used to drive the CCD register 23 in a two-phase fashion and gate clocks $\phi_{ROG1}$ through $\phi_{ROG4}$ that are used to open and/or close the first and second read-out gates 22, 24. The two-phase transfer clocks $\phi_1$, $\phi_2$ are applied to the CCD register 23 through a CCD driver 28 and the gate clocks $\phi_{ROG1}$ through $\phi_{ROG4}$ are applied to the first and second read-out gates 22, 24 through a gate driver 29.

Figure 8:
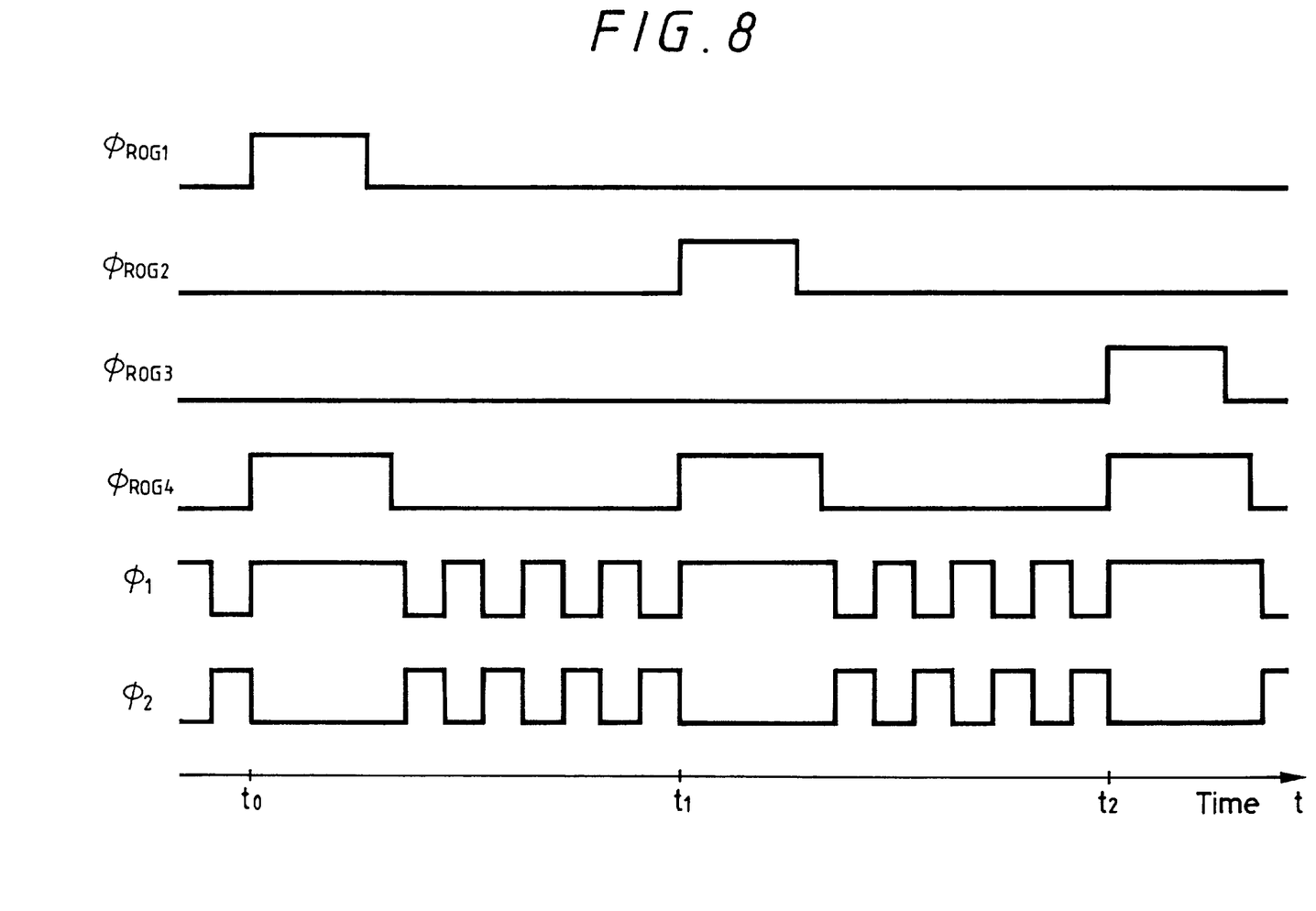
FIG. 8 is a timing chart used to explain operation of the color linear sensor according to the second embodiment of the present invention.

Operation of the color linear sensor arranged as described above will be described with reference to a timing chart forming FIG. 8.

Initially, at timing point $t=t_0$, the gate clocks $\phi_{ROG1}$ and $\phi_{ROG4}$ go to high "H" level, thereby turning on the ROG1 of the first read-out gate 22 and the second read-out gate (ROG4) 24. Also, the gate clocks $\phi_{ROG2}$, $\phi_{ROG3}$ go to low "L" level, thereby turning off the ROG2, ROG3 of the first read-out gate 22. Thus, only the signal charges stored in the R (red) photo sensor 1R are read out to the CCD register 23 and transferred by the CCD register 23. At this timing point, signal charges of one line of R (red) are read out.

At the next timing point $t=t_1$, the gate clocks $\phi_{ROG2}$, $\phi_{ROG4}$ go to high "H" level, thereby turning on ROG2, ROG4 of the first read-out gate 22. Also, the gate clocks $\phi_{ROG1}$, $\phi_{ROG5}$ go to low "L" level, thereby turning off the ROG1, ROG3 of the first read-out gate 22. Thus, only the signal charges stored in the G (green) photo sensor 1G are read out to the CCD register 23 and transferred by the CCD register 23. At this timing point, the signal charges of one line of G (green) are read out after one line of R (red).

At the next timing point $t=t_2$, the gate clocks $\phi_{ROG3}$, $\phi_{ROG4}$ go to high "H" level, thereby turning on the ROG3, ROG4 of the first read-out gate 22. Also, the gate clocks $\phi_{ROG1}$, $\phi_{ROG2}$ go to low "L" level, thereby turning off the ROG1, ROG2 of the first read-out gate 22. Consequently, only the signal charges stored in the B (blue) photo sensor 1B are read out to the CCD register 23 and transferred by the CCD register 23. At that time point, signal charges of each line of R, G, B are read out.

As described above, since the color linear sensor of the present invention has the dot-sequential sensor array, the sensors can be protected from being positionally displaced unlike the color linear sensor of line-sequential output type having three sensor arrays. In addition, the color linear sensor of the present invention needs only one output pin (terminal), which can simplify the configuration of the external circuit. Further, since signal charges are output in a line-sequential fashion, signal charges deteriorated by the transfer operation by the CCD register 23 can be prevented from appearing on the picture as the color mixture.

Further, since the read-out gate for reading out signal charges from the sensor array 1 is formed as a two-stage configuration composed of the first and second read-out gates 22, 24, the bit number of the CCD register 23 can be reduced to ⅓ of the pixel number of the sensor array 1 and the transfer frequency of the CCD register 23 can be decreased to ⅓, which can reduce an electric power consumption.

While the read-out gate is formed as the two-stage configuration to output signal charge in a line-sequential fashion as described above, even if the second read-out gate 24 is omitted, signal charges can be output in a line-sequential manner by the dot-sequential sensor array by properly controlling the drive timing of the first read-out gate 22. In this case, however, the bit number of the CCD register 23 becomes the same as the number of pixels forming the sensor array 1 so that the frequency three times as high as that described above is needed as the transfer frequency of the CCD register 23.

As described above, according to the present invention, the color linear sensor having the dot-sequential sensor array is arranged so as to output signal charges of one line at every color in a line-sequential fashion. Because the color linear sensor of the present invention includes the dot-sequential sensor array, the sensors can be prevented from being displaced in position unlike the color linear sensor of the line-sequential output type. Further, the color linear sensor of the present invention needs only one output pin (terminal), which can simplify the configuration of the external circuit. Also, since the color linear sensor of the present invention outputs signal charges in a line-sequential fashion, the color mixture caused by the deterioration of signal charges transferred by the transfer register can be avoided.

Furthermore, since the read-out gate is formed of two-stage read-out gates, the bit number of the transfer register can be reduced to ⅓ of the pixel number of the sensor array. Hence, the transfer frequency of the transfer register can be reduced to ⅓, which can reduce an electric power consumption.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A solid state color linear image sensing device comprising:
    a linear array of a plurality of units of color sensors, each unit in said linear array comprising a first color sensor sensing a first color to generate first charges, a second color sensor sensing a second color to generate second charges and a third color sensor sensing a third color to generate third charges,
    a charge transfer section running parallel to said linear array for transferring said first, second and third charges to an output terminal,
    means for selectively transferring said first, second and third charges from said units to said charge transfer section, said means formed between said linear array and said charge transfer section,
    means for driving said transferring means and said charge transfer section such that said first charges generated in all said units are simultaneously transferred to said charge transfer section in a first time period, said second charges generated in all said units are simultaneously transferred to said charge transfer section in a second time period following said first time period and said third charges generated in all said units are simultaneously transferred to said charge transfer section in a third time period following said second time period and further wherein there are different color sensors adjacent to one another in a single row of said linear array.

2. The solid state color linear image sensing device according to claim 1 wherein said charge transfer section has one third as many bits as said linear array.

3. The solid state color linear image sensing device according to claim 1 having only one linear array and only one charge transfer section.

4. A solid state color linear image sensing device comprising:
    a linear array of a plurality of units of color sensors, each unit comprising a first color sensor sensing first color to generate first charges, a second color sensor sensing a second color to generate second charges and a third color sensor sensing a third color to generate third charges,
    a charge transfer section running parallel to said linear array for transferring said first, second and third charges to an output terminal,
    means for selectively transferring said first, second and third charges from said units to said charge transfer section, said means formed between said linear array and said charge transfer section,
    means for driving said transferring means and said charge transfer section such that said first charges generated in all said units are transferred to said output terminal in a first time period, said second charges generated in all said units are transferred to said output terminal in a second time period following said first time period and said third charges generated in all said units are transferred to said output terminal in a third time period following said second time period,
    wherein said selectively transferring means comprises a plurality of sets of first gates, each set corresponding to one of said units and comprising three read out gates, each read out gate corresponding to one of said first, second and third color sensors, and a plurality of second gates disposed between said sets of first gates and said shift register, each second gate corresponding to one of said sets.

5. A method for driving a solid state color image sensing device comprising the steps of:
    providing a linear array of a plurality of first and second color sensors capable of sensing first and second colors respectively to generate first and second charges respectively, and a charge transfer section transferring said first and second charges to an output terminal;

simultaneously reading out said first charges from said first color sensors to said charge transfer section, transferring said first charges through said charge transfer section to said output terminal, subsequently simultaneously reading out said second charges from said second color sensors to said charge transfer section after transferring said first charges, transferring said second charges through said charge transfer section to said output terminal and further wherein there are different color sensors adjacent to one another in a single row of said linear array.

6. The method according to claim 5 wherein said device has only one linear array of a plurality of first and second color sensors.

7. The method according to claim 5 wherein said charge transfer section formed parallel to said array.

8. A solid state color imaging device comprising;

a linear array of first color sensors, second color sensors and third color sensors, said first, second and third color sensors being adapted for converting the light received by way of different color transmitting filters into signal charges, a standard sensor formed in said array being adapted for converting the light received by way of a color transmitting filter which has specific color selected among said first, second and third colors into standard signal charges, light shielded sensors formed in said array, said light shielded sensors located on both sides of said standard sensor, to prevent color mixture, shift register means for transferring said signal charges generated in said first, second and third color sensors and said standard signal charges generated in said standard sensor.

9. The solid state color imaging device according to claim 8 further comprising, a detecting means which detects a voltage difference between a signal from said standard sensor and a signal from said color sensor corresponding to the same color as said specific color.

10. The solid state color linear image sensing device according to claim 4 wherein said each second gate has three inputs and has one output connected to said charge transfer section.

11. The method of claim 5, further comprising the additional steps of:

comparing an output signal corresponding to a first charge with a signal from a reference pixel to generate a difference vale and adjusting a level of said output signal based on said difference.

12. The image sensing device of claim 1, further comprising a means for correcting an output signal level based on a difference signal derived from a reference pixel value.

* * * * *